United States Patent
Balasaygun et al.

(10) Patent No.: US 9,544,336 B2
(45) Date of Patent: Jan. 10, 2017

(54) MECHANISMS FOR HANDLING SIP GLARE ACROSS MULTIPLE DIALOGS

(71) Applicants: Mehmet Balasaygun, Freehold, NJ (US); Eric Cooper, Kanata (CA); Harsh Mendiratta, East Brunswick, NJ (US); Rifaat Shekh-Yusef, Belleville (CA)

(72) Inventors: Mehmet Balasaygun, Freehold, NJ (US); Eric Cooper, Kanata (CA); Harsh Mendiratta, East Brunswick, NJ (US); Rifaat Shekh-Yusef, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 218 days.

(21) Appl. No.: 14/295,400

(22) Filed: Jun. 4, 2014

(65) Prior Publication Data

US 2015/0358361 A1    Dec. 10, 2015

(51) Int. Cl.
*G06F 15/16*    (2006.01)
*H04L 29/06*    (2006.01)

(52) U.S. Cl.
CPC ....... *H04L 65/1006* (2013.01); *H04L 65/1069* (2013.01)

(58) Field of Classification Search
USPC ........................................................ 709/228
See application file for complete search history.

(56) References Cited

U.S. PATENT DOCUMENTS

| 2011/0264746 A1* | 10/2011 | Yin | H04L 69/28 709/206 |
| 2014/0214972 A1* | 7/2014 | Nemani | H04L 65/1006 709/206 |
| 2014/0226657 A1* | 8/2014 | Bouvet | H04L 65/1016 370/352 |

OTHER PUBLICATIONS

R. Mahy, The Session Initiation Protocol (SIP) "Join" Header, Oct. 2004, RFC 3911.*
Hasebe et al. "Example Call Flows of Race Conditions in the Session Initiation Protocol (SIP)," IETF, Dec. 2008, RFC: 5407, 60 pages.
Rosenberg et al. "SIP: Session Initiation Protocol," The Internet Society, Jun. 2002, RFC: 3261, 270 pages.

* cited by examiner

*Primary Examiner* — Kristie Shingles
*Assistant Examiner* — Mohammad Yousuf A Mian
(74) *Attorney, Agent, or Firm* — Sheridan Ross P.C.

(57) ABSTRACT

The system and method detect and properly handle a glare condition in a SIP communication session. A glare condition is where a communication device has two concurrent outstanding requests (typically an incoming and an outgoing request that have not be acknowledged) and needs to process one of the requests before processing the other request. To detect a glare condition, the system and method identify that an out-of-dialog SIP request is received while an outgoing SIP request is pending. In response to detecting the glare condition, a glare algorithm is initiated. The glare algorithm ensures that outstanding requests will be handled in a timely manner.

18 Claims, 5 Drawing Sheets

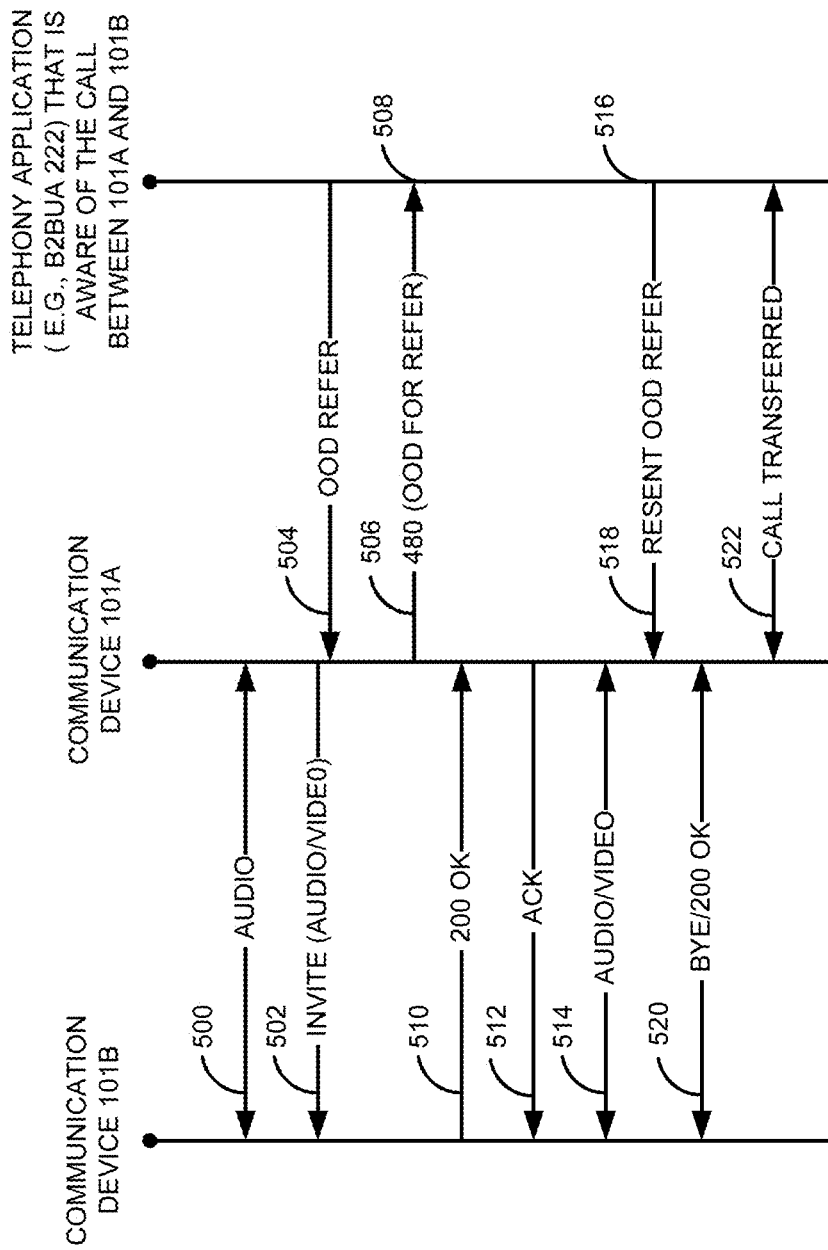

MECHANISMS FOR HANDLING SIP GLARE ACROSS MULTIPLE DIALOGS

TECHNICAL FIELD

The systems and methods disclosed herein relate to Session Initiation Protocol (SIP) and in particular to systems and methods that deal with SIP glare conditions.

BACKGROUND

The SIP is a very robust protocol that has become ubiquitous in the telecommunication industry. SIP is the core protocol for most voice and video communication products that are being shipped today. The proliferation of SIP has lead to a variety of SIP based standards that allow for conformance between communication equipment provided by different vendors. However, the existing SIP standards fall short in dealing with all types of conditions that are prevalent in SIP communication networks.

For example, the SIP standard disclosed in RFC3261 and the Best Current Practices (BCP) document disclosed in RFC5407 describe how to deal with glare conditions for communication devices that are engaged in the same SIP dialog. A glare condition is where a device, such as a telephone, has sent a first request and receives a second request before receiving an acknowledgment to the first request. For example, a glare condition in the same dialog results when a telephone sends a hold command to another telephone on the same call while receiving a hold command simultaneously from the other telephone. The result can be a prolonged waiting period before either request is processed.

The existing SIP RFCs describe how to handle glare conditions for in-dialog SIP requests (e.g., where a SIP communication session has been established between the devices). However, the existing SIP RFCs do not describe how to deal with glare conditions that occur as a result of out-of-dialog operations. This may result in unexpected behavior of products and may lead to interoperability issues.

SUMMARY

Systems and methods are provided to solve these and other problems and disadvantages of the prior art. The system and method detect and properly handle a glare condition in a SIP communication session. A glare condition is where a communication device receives an incoming request, such as a SIP-Join or a SIP INVITE REFER message, while having an outstanding request towards the communication peer (typically an incoming and an outgoing request that have not been acknowledged) and needs to process one of the requests before processing the other request. To detect a glare condition, the system and method identify that an out-of-dialog SIP request received while a related outgoing SIP request is pending. In response to detecting the glare condition, a glare algorithm is initiated. The glare algorithm ensures that outstanding requests will be handled in a timely manner.

In one embodiment, the glare algorithm includes receiving, at first communication device, a SIP 480 response message that indicates a pending request in a second communication device. In response to receiving the SIP 480 response message, the first communication device starts a first glare timer. The second communication device also receives a SIP 480 response message that indicates a pending request in the first communication device. In response to receiving the SIP 480 response message, the second communication device starts a second glare timer. The first glare timer and the second glare timer are not adjacent to one another, which results in one of the glare timers expiring before the other.

In one embodiment, the outgoing SIP request is a SIP Re-INVITE message to update an audio call to an audio and video call and the second SIP request is a SIP REFER message. The SIP REFER message may be an in-dialog request (e.g., a transfer request) or an out-of-dialog request that is targeted to affect the existing dialog. If it is an out of dialog request, the User Agent receiving the request sends a SIP 480 with a Retry-After to indicate to the requestor that the targeted dialog has a pending request. In response to the second glare timer expiring, the second communication device resends the SIP REFER message. In response to receiving the resent SIP REFER message, the first communication device sends a SIP INVITE to the address specified in the Refer-To header from the SIP REFER message.

BRIEF DESCRIPTION OF THE DRAWINGS

FIG. 5 is a flow diagram for handling glare conditions for out-of-dialog operations.

DETAILED DESCRIPTION

Figure 1:
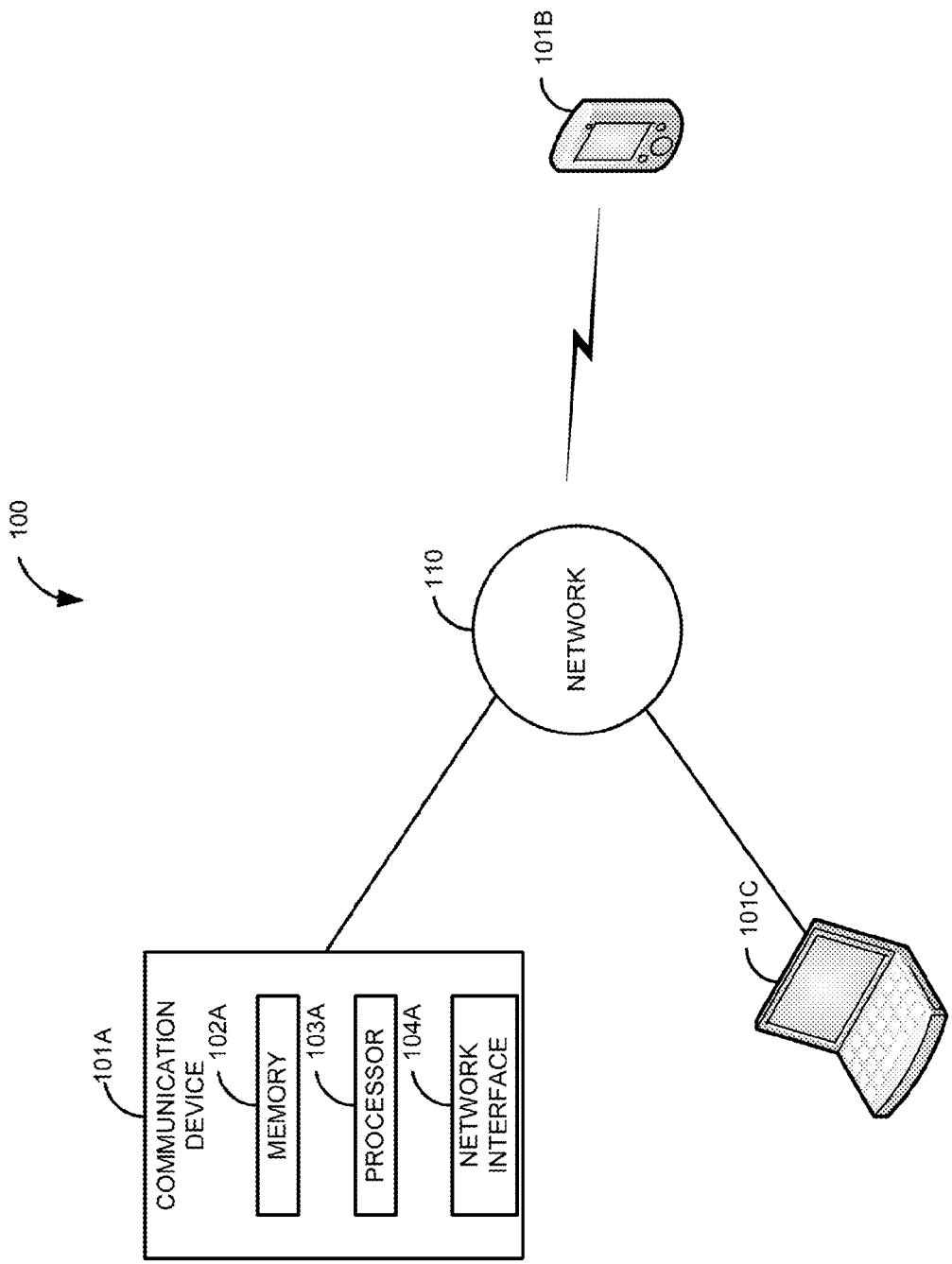
FIG. 1 is a block diagram of a first illustrative system for handling glare conditions for out-of-dialog operations.

FIG. 1 is a block diagram of a first illustrative system 100 for handling glare conditions for out-of-dialog operations. The first illustrative system 100 comprises communication devices 101A-101C and a network 110.

The communication devices 101A-101C can be or may include any device that terminates a communication session, such as a telephone, a computer, a laptop computer, a cellular telephone, a smart phone, a video phone, a Personal Digital Assistant (PDA), a tablet device, a SIP User Agent (UA), an Instant Messaging Device, a text device, an email device, and/or the like. In some embodiments, one or more of the communication devices 101A-101C may be a Back-to-Back User Agent as described in FIG. 2. In FIG. 1, there are three communication devices 101A-101C shown. However, in other embodiments, any number of communication devices 101 can be used.

The communication device 101A comprises a memory 102A, a processor 103A, and a network interface 104A. The memory 102A can be or may include any type of memory that can be used to store information, such as a Random Access Memory (RAM), a flash memory, a disk drive, a Read Only Memory (ROM), a RAM drive, and/or the like. The processor 103A can be or may include any type of processor, such as a Digital Signaling Processor (DSP), a multi-core processor, a micro-controller, an Application Specific Integrated Circuit (ASIC), a microprocessor, and/or the like. The network interface 104A can be or may include any hardware/software that can communicate on the network 110, such as an Ethernet interface, an 802.11 interface, a cellular interface, a wired interface, a wireless interface, a fiber optic interface, an Integrated Digital Services Network (ISDN) interface, an analog interface, a cable interface, and/or the like.

The communication device 101A is shown comprising the memory 102A, the processor 103A, and the interwork interface 104A. Although not shown, the communication devices 101B-101C also comprises a corresponding memory 102B-102C, a corresponding processor 103B-103C, and a corresponding interwork interface 104B-104C.

The network 110 can be or may include any network that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, and/or the like. While the described embodiment uses SIP, the described embodiments can apply to situations where a SIP gateway is used to establish a communication session from a non SIP network, such as the PSTN.

The communication system described in FIG. 1 is shown as a peer-to-peer network. However, in other embodiments, equipment in the network 110 can be used to facilitate a communication session. For example, the network 110 can include a SIP proxy server to help establish SIP communication sessions between the communication devices 101A-101C. In one embodiment, all the communication devices 101A-101C are SIP User Agents (UAs). A SIP UA can include a session boarder controller.

A SIP first dialog (i.e., a communication session) is established between the communication device 101A and the communication device 101B. The first SIP dialog can be any type of SIP dialog, such as a SIP dialog for a voice communication session, a video communication session, an Instant Messaging (IM) communication session, a text communication session, and/or the like. Although the first SIP dialog is described as a single two party communication session, the first SIP dialog can include additional SIP dialogs between other communication devices 101.

The network interface 104A of the communication device 101A sends an outgoing SIP request for the first SIP dialog. For example, the network interface 104A can send an in-dialog SIP INVITE message to the communication device 101B to invite the communication device 101B to change an existing voice call to a video/voice call. While the outgoing SIP request (the SIP INVITE) is pending (before it is acknowledged), the network interface 104A receives a second SIP request that is an out-of-dialog message that affects the call state of the first SIP dialog. An out-of-dialog message is a message that is intended for another SIP dialog (i.e., a separate call).

For example, the communication device 101A is on a call with the communication device 101B. The communication device 101A sends an in-dialog INVITE to the communication device 101B (e.g., to add video to the call). At the same time, a communication device 101D (not shown) sends an out-of-dialog request affecting the call that the communication device 101A has with the communication device 101B. For example, the incoming out-of-dialog request can be an INVITE with Join request where the communication device 101D wants to join the call between the communication device 101A and the communication device 101B. Alternatively, the incoming out-of-dialog request can be a SIP REFER message sent by a Computer Telephone Integration (CTI) application to change the state of the dialog between the communication device 101A and the communication device 101B. For example, a SIP REFER can be used to hold the call between the communication device 101A and the communication device 101B.

This is an example of where the communication device 101A is experiencing a glare condition of where an out-of-dialog request that affects the call state is received (e.g., a SIP REFER or SIP INVITE) before the SIP outgoing request (the SIP INVITE) is acknowledged. When this occurs, the communication device 101B sends SIP 480 response message to the communication device 101A. The communication device 101A sends a SIP 480 response message to the communication 101B.

With existing RFCs (RFC 5407 and 3261), in response to receiving a SIP 480 response message, the communication devices 101A and 101B will resend their respective requests. The problem with this strategy is that the glare condition may be repeated.

To resolve the problem of receiving an out-of-dialog SIP request while an outstanding SIP request is pending, the communication devices 101A and 101B initiate a glare algorithm. When the communication device 101A receives the SIP 480 response message from the communication device 101B, the communication device 101A starts a first glare timer using a first timer value. The first glare timer is used for resending the outgoing SIP request (the SIP Re-INVITE).

Likewise, when the communication device 101B receives the SIP 480 message (which includes a Retry-After header) from the communication device 101A, the communication device 101B starts a second glare timer using a second timer value. The second glare timer is used for resending the second SIP request (the SIP REFER).

The first timer value and the second timer value are not adjacent to one another. A timer value is not adjacent to another timer value where the value of one timer is long enough to accommodate for delays and processing in the network/devices. For example, the first timer value may be three seconds and the second timer value may be zero seconds. Alternatively, the first timer value may be four seconds and the second timer value may be one second. In these examples, the difference between the two timer values (three seconds) is enough to allow for delays and processing in the network 110/communication devices 101. This is different from RFC 3261 where the timers have a gap of 100 ms. In this example, the timer values are defined as 0-1 seconds and 3-4 seconds (a gap of 2 seconds). The non-adjacent time intervals provide enough time between the timers that a second glare condition will not occur. Because of the time difference, the communication device 101 with the shortest timer value will resend its SIP request first. The SIP request will be received and processed before the other communication device 101 resends its SIP request. In one embodiment, the timer values can be user defined (e.g., administered by an administrator).

In one embodiment, the communication device 101 that initiated (e.g., the communication device 101 that initiated a voice call) the first SIP dialog will choose a longer timer value while the communication device 101 that did not initiate the first SIP dialog will choose the shorter timer value. In another embodiment, this may be reversed.

The communication device 101 that is a related-dialog glare responds to the glare induced request (e.g. a SIP REFER) with a SIP 480 response message that includes a Retry-After header. The value of the Retry-After header can be selected to be in one of the two non-adjacent ranges. The selection of the specific non-adjacent range is made based on which device initiated the SIP dialog.

For example, suppose that the communication device 101B and the communication device 101C are engaged in an audio call. The communication device 101A sends an out-of-dialog SIP REFER to the communication device 101B, which targets the audio call between the communication device 101B and the communication device 101C. Unbeknownst to the communication device 101A, the communication device 101B has simultaneously initiated a hold request (via INVITE) on the call between the communication device 101B and the communication device 101C. When the SIP REFER from the communication device 101A arrives at the communication device 101B, the communication device 101B must detect the related dialog glare and send a SIP 480 response to the communication device 101A with the Retry-After timer value from one of two non-adjacent ranges. The communication device's selection of the one of the two no-adjacent ranges is based on whether the original call between the communication device 101B and the communication device 101C was initiated by the communication device 101B or the communication device 101C.

The above example describes the second SIP request as being a SIP REFER message. In this example, the SIP REFER message is an out-of-dialog message. Alternatively, the second SIP request can be a different type out-of-dialog SIP message that affects the call state of the first SIP dialog, such as a SIP INVITE message with Join header, a SIP INVITE message with Replaces header, a SIP REFER with an action Uniform Resource Name (URN) in the Refer-To header, a SIP REFER hold message, a SIP REFER message with method=REFER parameter in the URI provided in the Refer-To header, or a SIP REFER message with method=BYE parameter in the URI provided in the Refer-To header.

Figure 2:
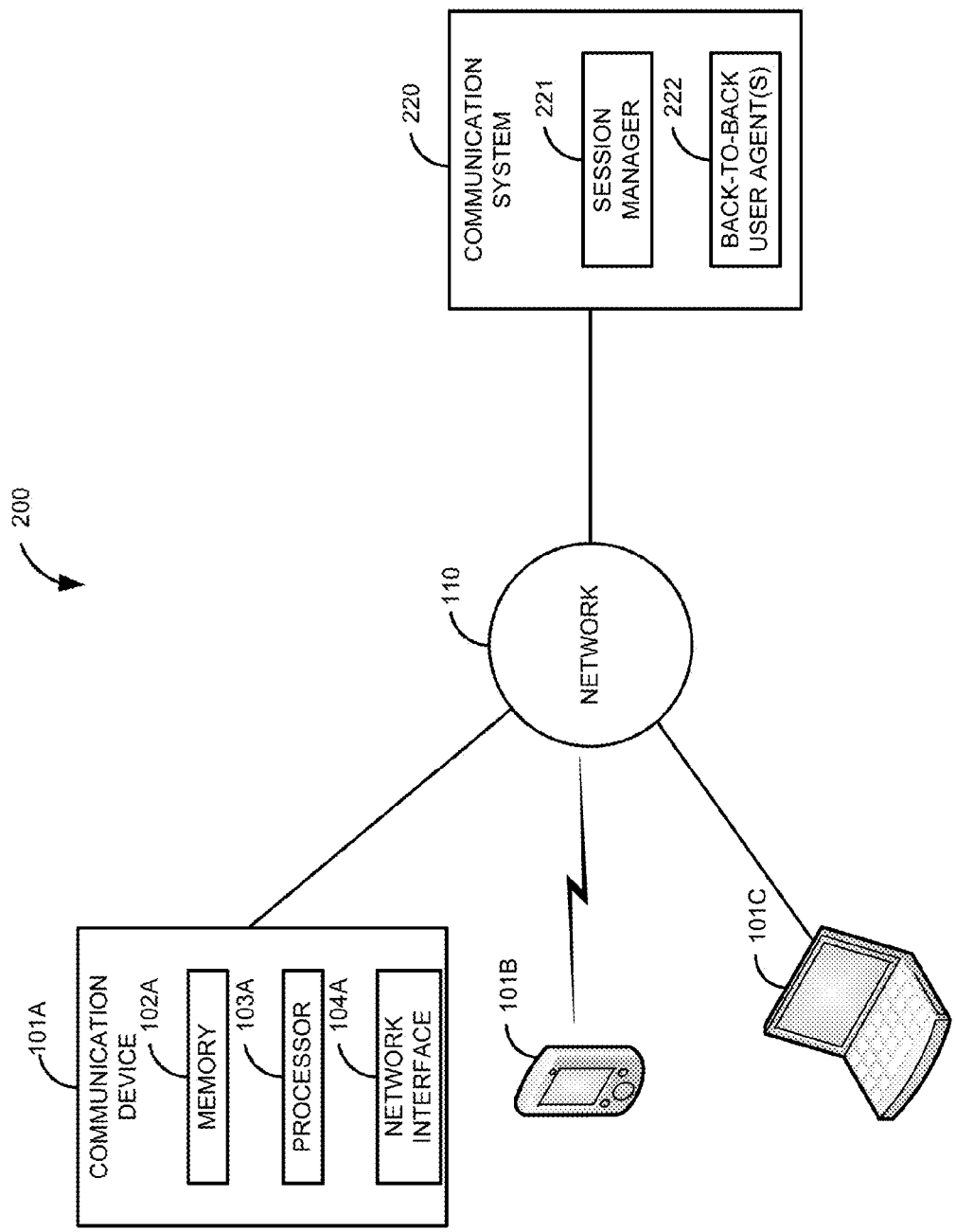
FIG. 2 is a block diagram of a second illustrative system for handling glare conditions for out-of-dialog operations that involve a Back-to-Back User Agent (B2BUA).

FIG. 2 is a block diagram of a second illustrative system 200 for handling glare conditions for out-of-dialog operations that involve a Back-to-Back User Agent (B2BUA) 222. The second illustrative system 200 comprises the communication devices 101A-101C, the network 110, and a communication system 220. The communication system 220 can be or may include any hardware/software that can manage communication sessions, such as a Private Branch Exchange (PBX), a SIP proxy server, a session manager 221, a central office switch, and/or the like. The communication system 220 further comprises a session manager 221 and a B2BUA 222. The session manager 221 and the B2BUA 222 are shown as part of the communication system 220. However, in some embodiments, the session manager 221 and the B2BUA 222 are separate elements distributed within the network 110.

The session manager 221 can be or may include any hardware/software that can manage communication sessions, such as SIP dialogs. The B2BUA 222 can be or may include any hardware/software that can provide features for a communication session. For example the B2BUA 222 may provide call forwarding, call recording, call transfer, conferencing, translation, and/or other services. The B2BUA 222 can comprise multiple B2BUAs 222.

A communication session is setup between communication device 101A and the communication device 101B by the session manager 221. As part of the setup of the communication session between the communication device 101A and the communication device 101B, the B2BUA 222 is also inserted into the communication session. When a B2BUA 222 is inserted into the communication session between the communication device 101A and the communication device 101B, there are two SIP dialogs established to represent an end-to-end session (e.g., a voice call). A first SIP dialog is established between the communication device 101A and the B2BUA 222. A second SIP dialog is established between the communication device 101B and the B2BUA 222.

The B2BUA 222 sends to the communication device 101A an outgoing SIP request for the first SIP dialog between the first communication device 101A and the B2BUA 222. For example, the outgoing SIP request can be a SIP REFER message that was sent from the communication device 101B via the second SIP dialog and forwarded by the B2BUA 222 to the communication device 101A via the first SIP dialog. While the outgoing SIP request is pending in the B2BUA 222, a second SIP request is received by the B2BUA 222 from the communication device 101A. The second SIP request is an out-of-dialog SIP message that affects the call state of the first SIP dialog.

In response to the outgoing SIP request pending and the second request being the out-of-dialog SIP message that affects the call state of the first SIP dialog, the B2BUA 222 initiates a glare algorithm.

Figure 3:
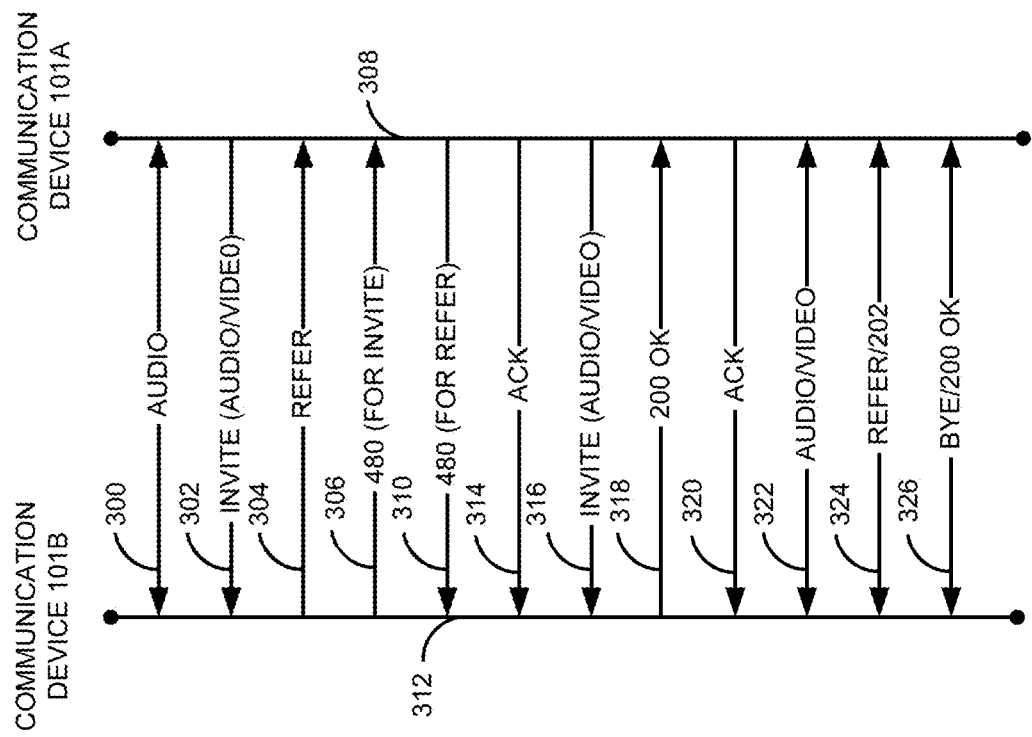
FIG. 3 is a flow diagram of a process for handling glare conditions for out-of-dialog operations.
Figure 4:
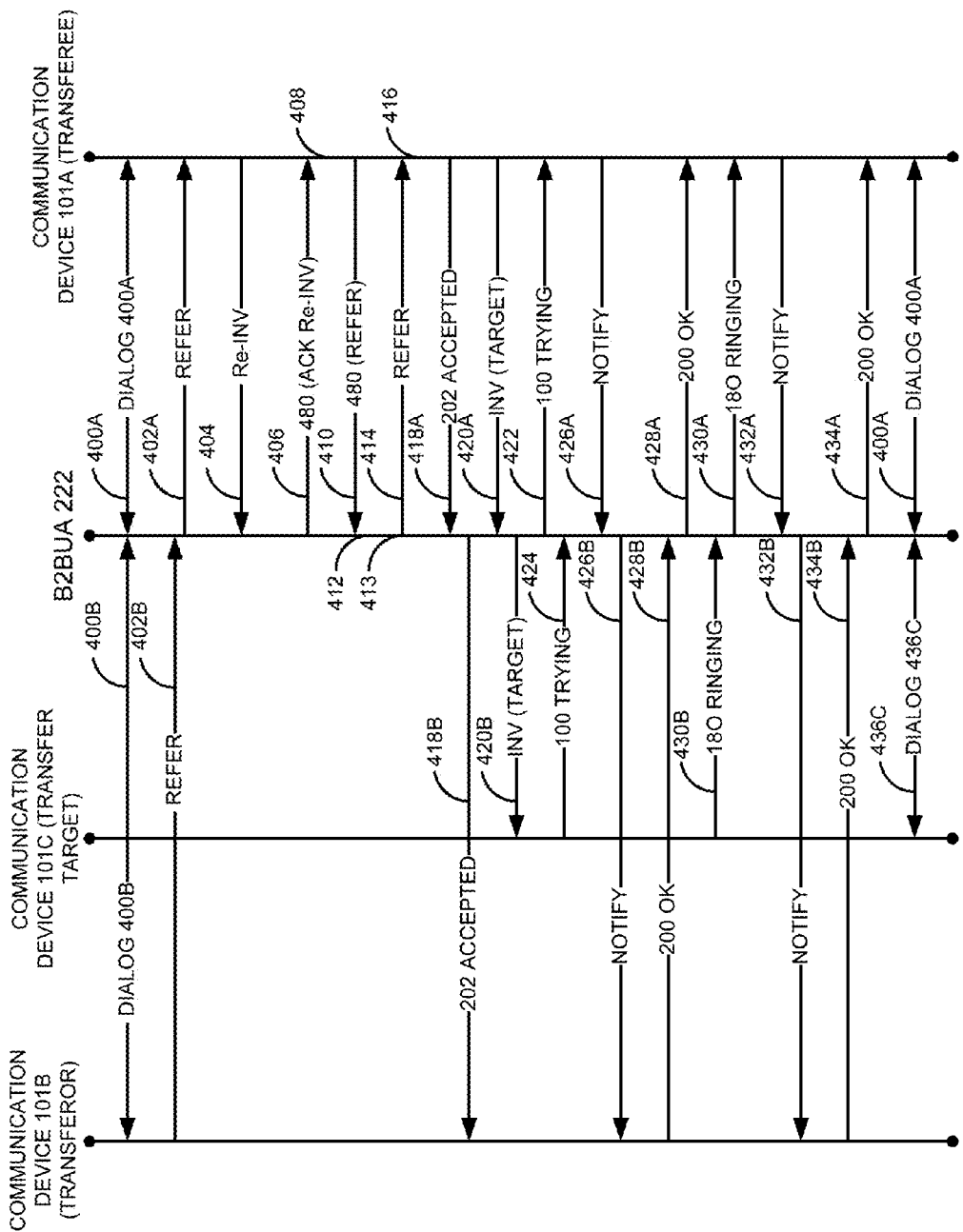
FIG. 4 is a flow diagram of a process for handling glare conditions for out-of-dialog operations that involve a Back-to-Back User Agent (B2BUA).

FIG. 3 is a flow diagram of a process for handling glare conditions. Illustratively, the communication devices 101A-101C, the communication system 220, the session manager 221, and the B2BUA 222 are stored-program-controlled entities, such as a computer or processor, which performs the method of FIGS. 3-4 and the processes described herein by executing program instructions stored in a tangible computer readable storage medium, such as a memory or disk. Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

An audio SIP dialog (communication session) is established between the communication device 101A and the communication device 101B in step 300. After a SIP dialog has been established between the communication device 101A and the communication device 101B, the communication device 101A sends a SIP INVITE message to the communication device 101B in step 302. The SIP INVITE is to invite the communication device 101B to switch the audio communication session to a video and audio communication session. While the SIP INVITE is pending, the communication device 101A receives a SIP REFER message from the communication device 101B in step 304. The SIP INVITE and the SIP REFER are shown in FIG. 3 as being sent and received one after the other. However, the two messages may be sent and received at approximately the same time.

In response to receiving the SIP Re-INVITE in step 302 and having sent the SIP REFER message in step 304, the communication device 101B sends a SIP 480 response message to indicate that the communication device 101B has a request pending in step 306. In response to receiving the SIP 480 response message sent in step 304, the communication device 101A starts a first glare timer with a first timer value in step 308.

The communication device 101A sends, in step 310, a SIP 480 response message based on the SIP INVITE sent in step 302 and the received SIP REFER message received in step 304. In response to receiving the SIP 480 response message in step 310, the communication device 101B initiates a second glare timer with a second timer value in step 312.

The first and second timer values are not adjacent to one another. The communication device 101A sends in step 314 an SIP ACK in response to the SIP 480 response message sent in step 306.

Upon expiration of the communication device 101A's glare timer (assuming that the timer initiated by the communication device 101A was shorter than the one initiated by the communication device 101B), the communication device 101A resends in step 316 the SIP INVITE for audio/video communication session. The communication device 101B receives the SIP INVITE for audio/video. The communication device 101B sends, in step 318, a 200 OK in response to the received SIP INVITE of step 316. The communication device 101A sends a SIP ACK in step 320 to acknowledge the SIP 200 OK sent in step 318. The audio/video SIP dialog is established in step 322.

At this point, the SIP REFER can optionally be resent to transfer the SIP dialog using standard SIP signaling as shown in steps 324-326. The SIP dialog is then transferred to communication device 101C.

FIG. 4 is a flow diagram of a process for handling glare conditions for out-of-dialog operations or operations that affect other dialogs that involve a Back-to-Back User Agent (B2BUA) 222. The process starts in step 400 when a SIP communication session is established between the communication device 101A and the communication device 101B. In this example, the communication session includes the B2BUA 222. As a result there is a first SIP dialog 400A between the B2BUA 222 and the communication device 101A and a second SIP dialog 400B between the B2BUA 222 and the communication device 101B.

The communication device 101B sends, in step 402B, an out-of-dialog SIP REFER message to the B2BUA 222 in dialog 400B. The B2BUA 222 sends, in step 402A, the out-of-dialog SIP REFER to the communication device 101A in dialog 400A. The communication device 101A sends a SIP Re-INVITE message to the B2BUA 222 in step 404 in the dialog 400A. The SIP Re-INVITE and the SIP REFER are shown in FIG. 4 as being sent and received one after the other. However, the two messages may be sent and received at approximately the same time.

The B2BUA 222, based on having received the SIP Re-INVITE in step 404 while the SIP REFER was outstanding in step 402A, sends a SIP 480 response message to the communication device 101A in step 406. In response to receiving the SIP 480 response message in step 406, the communication device 101A initiates a first glare timer using a first timer value in step 408.

The communication device 101A, in response to sending the SIP Re-INVITE in step 404 and receiving the SIP REFER in step 402A sends a SIP 480 response message to the B2BUA 222 in step 410. In response to receiving the SIP 480 response message in step 410, the B2BUA 222 initiates a second glare timer using a second timer value in step 412. The second glare timer expires in step 413. In response to the second glare timer expiring, the B2BUA 222 resends the SIP REFER in step 414. In response to receiving the SIP REFER message in step 414, the communication device 101A processes the SIP REFER message in step 416. The communication device 101A sends a SIP 202 Accepted message in step 418A. The B2BUA 222 sends the SIP 202 Accepted message to the communication device 101B to indicate that the SIP REFER message has been accepted in step 418B.

The communication device 101A sends, in step 420A, a SIP INVITE using a target address of the communication device 101C that was sent in the SIP REFER message of step 414. The SIP INVITE is sent by the B2BUA 222 to the communication device 101C in step 420B. The B2BUA 222 responds to the SIP INVITE in step 422 by sending a SIP Trying message to the communication device 101A. The communication device 101C responds to the SIP INVITE of step 420B by sending a SIP 100 Trying message to the B2BUA 222 in step 424.

The communication device 101A sends a SIP Notify message in step 426A to the B2BUA 222 to notify the B2BUA 222 of the status of the transfer. The B2BUA 222 sends the SIP Notify message to the communication device 101B in step 426B. The communication device 101B sends a 200 Ok to acknowledge the SIP Notify message in step 428B. The B2BUA 222 sends the 200 Ok to the communication device 101A in step 428A.

The communication device 101C sends a SIP 180 Ringing message to the B2BUA in step 430B. The B2BUA sends the SIP 180 Ringing message to the communication device 101A in step 430A. The communication device 101A sends a SIP Notify message in step 432A to the B2BUA 222 to inform the B2BUA 222 of receiving the 180 Ringing message. The B2BUA 222 sends the SIP notify to the communication device 101B in step 432B. In response to receiving the SIP Notify message in step 432B, the communication device 101B sends a 200 Ok message to the B2BUA 222 in step 434B. The B2BUA 222 forwards the 200 Ok to the communication device 101A in step 434A.

After this point, the communication session with the communication device 101C is established with the communication device 101A using standard SIP messaging. This results in a third SIP dialog (dialog 436C) along with the first dialog (dialog 400A). The communication device 101A can optionally resend the SIP Re-INVITE message of step 402.

FIG. 5 is a flow diagram for handling glare conditions for out-of-dialog operations. An audio SIP call (e.g., using RTP) has been established between the communication device 101A and the communication device 101B in step 500. The communication device 101A sends a SIP INVITE to the communication device 101B to change the audio call to an audio/video call in step 502. The communication device 101A receives an out-of-dialog SIP REFER in step 504 from a telephony application (e.g. the B2BUA 222 that is aware of the voice call between the communication device 101A and the communication device 101B).

Because the out-of-dialog REFER affects the call state of the dialog between the communication device 101A and the communication device 101B, and the SIP INVITE sent in step 502 is still pending, the communication device 101A sends a SIP 480 response message in step 506 to the telephony application. In response to receiving the SIP 480 response message, the telephony application starts a glare timer in step 508.

The communication device 101B sends a 200 OK message to the communication device 101A in step 510. The communication device 101A sends a SIP ACK to the communication device 101B in step 512. The communication devices 101A and 101B establish an audio/video communication session (e.g., using RTP) in step 514.

The glare timer that was started in step 508 expires in step 516. In response to the glare timer expiring, the telephony application resends the out-of-dialog SIP REFER message in step 518. The communication devices 101A and 101B send a SIP BYE/200 OK messages to tear down the audio/video call in step 520. The call is then transferred from the communication device 101B to the telephony application in step 522.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   sending, by a microprocessor in a first communication device to a second communication device, an outgoing Session Initiation Protocol (SIP) request for a first SIP dialog between the first communication device and the second communication device;
   while the outgoing SIP request is pending, the microprocessor receiving a second SIP request, wherein the second SIP request is an out-of-dialog SIP message for another SIP dialog that affects a call state of the first SIP dialog; and
   in response to the outgoing SIP request still pending and the second SIP request being the out-of-dialog SIP message for another SIP dialog that affects the call state of the first SIP dialog, initiating, by the microprocessor, a glare algorithm.

2. The method of claim 1, wherein the glare algorithm comprises:
   receiving, by the microprocessor, a first SIP 480 response message sent from the second communication device;
   in response to receiving the first SIP 480 response message, the microprocessor starting first glare timer using a first timer value to wait for resending the outgoing SIP request;
   sending, by the microprocessor, to the second communication device, a second SIP 480 response message from the first communication device, wherein the second SIP 480 response message causes the second communication device to start a second glare timer using a second timer value to wait before resending the second SIP request, wherein the first timer value and the second timer value are not adjacent to one another.

3. The method of claim 2, further comprising:
   receiving, by the microprocessor, the resent second SIP request at the first communication device based on the expiration of the second glare timer; and
   in response to receiving the resent second SIP request, processing, by the microprocessor, the resent second SIP request.

4. The method of claim 2, wherein the outgoing SIP request is an in-dialog SIP INVITE message to update a state of an existing call, wherein the second SIP request is an out-of-dialog SIP REFER message, and further comprising:
   in response to the second glare timer expiring, receiving, by the microprocessor, the out-of-dialog SIP REFER message; and
   in response to the first glare timer expiring, sending, by the microprocessor, a SIP INVITE using a Refer-To address from the out-of-dialog SIP REFER message.

5. The method of claim 2, where the first timer value is based on the first communication device initiating the first SIP dialog and the second timer value is based on the second communication device not initiating the first SIP dialog.

6. The method of claim 1, wherein the received second SIP request is one of a SIP INVITE message with Join header, a SIP INVITE message with Replaces header, a SIP REFER message with an action Uniform Resource Name (URN) in the Refer-To header, a SIP REFER hold message, a SIP REFER message with method=REFER parameter in the URI provided in the Refer-To header, or a SIP REFER message with method=BYE parameter in the URI provided in the Refer-To header.

7. The method of claim 1, wherein the first communication device is a Back-to-Back User Agent (B2BUA) and the second communication device is a first User Agent (UA).

8. The method of claim 1, wherein the received first SIP request is a SIP-Join and the second received request is a SIP REFER message.

9. The method of claim 1, wherein the received second SIP request is from a third communication device and wherein the glare algorithm comprises:
   sending by the microprocessor, a SIP 480 response message to the third communication device, wherein the SIP 480 response message causes the third communication device to start a glare timer to wait for resending the second SIP request.

10. A first communication device, wherein the first communication devices comprises:
    a network interface that sends, to a second communication device, an outgoing Session Initiation Protocol (SIP) request for a first SIP dialog between the first communication device and the second communication device, and receives, while the outgoing SIP request is pending, a second SIP request, wherein the second SIP request is an out-of-dialog SIP message for another SIP dialog that affects a call state of the first SIP dialog; and
    a microprocessor that initiates a glare algorithm in response to the outgoing SIP request still pending and the second SIP request being the out-of-dialog SIP message for another SIP dialog that affects the call state of the first SIP dialog.

11. The first communication device of claim 10, wherein:
    the network interface receives a first SIP 480 response message sent from the second communication device and sends a second SIP 480 response message to the second communication device, wherein the second SIP 480 response message causes the second communication device to start a second glare timer using a second timer value to wait before resending the second SIP request, wherein a first timer value and a second timer value are not adjacent to one another; and
    the microprocessor starts a first glare timer using the first timer value to wait for resending the outgoing SIP request in response to receiving the first SIP 480 response message.

12. The first communication device of claim 11, wherein:
    the network interface receives a resent second SIP request based on the expiration of the second glare timer; and
    in response to receiving the resent second SIP request, the microprocessor process the resent second SIP request.

13. The first communication device of claim 11, wherein the outgoing SIP request is an in-dialog SIP INVITE message to update a state of an existing call, wherein the second SIP request is an out-of-dialog SIP REFER message, and wherein:
    the network interface receives the out-of-dialog SIP REFER message in response to the second glare timer expiring, and
    sends a SIP INVITE using a Refer-To address from the out-of-dialog SIP REFER message, in response to the first glare timer expiring.

14. The first communication device of claim 11, wherein the first timer value is based on the first communication device initiating the first SIP dialog.

15. The first communication device of claim 10, wherein the received second SIP request is one of a SIP INVITE message with Join header, a SIP INVITE message with Replaces header, a SIP REFER message with an action Uniform Resource Name (URN) in the Refer-To header, a SIP REFER hold message, a SIP REFER message with method=REFER parameter in the URI provided in the Refer-To header, or a SIP REFER message with method=BYE parameter in the URI provided in the Refer-To header.

16. The first communication device of claim 10, wherein the first communication device is a Back-to-Back User Agent (B2BUA) and the second communication device is a first User Agent (UA).

17. The first communication device of claim 10, wherein the first and the second communication devices are user agents.

18. The first communication device of claim 10, wherein the received second SIP request is from a third communication device and wherein the glare algorithm comprises the microprocessor sending a SIP 480 response message to the third communication device that starts a glare timer to wait for resending the second SIP request.

\* \* \* \* \*